Nov. 7, 1967     E. F. APPLE ET AL     3,351,796

CALCIUM HALOPHOSPHATE PHOSPHOR FOR HIGHLY LOADED LAMP

Filed Oct. 22, 1965

Inventors:
Eugene F. Apple
John B. Hollopetre
by *Ernest W. Legree*
Their Attorney

United States Patent Office 3,351,796
Patented Nov. 7, 1967

3,351,796
CALCIUM HALOPHOSPHATE PHOSPHOR FOR HIGHLY LOADED LAMP
Eugene F. Apple, Highland Heights, and John B. Hollopetre, Willoughby, Ohio, assignors to General Electric Company, a corporation of New York
Filed Oct. 22, 1965, Ser. No. 501,466
2 Claims. (Cl. 313—109)

This invention relates to calcium halophosphate phosphors used in fluorescent lamps and other devices, and more particularly to such a phosphor intended for use in a highly loaded fluorescent lamp, that is one wherein the loading is in the range of 20 to 35 watts per foot length.

It has been known for many years that the efficiency and stability or maintenance of halophosphate phosphors used in fluorescent lamps could be improved by adding thereto small amounts of cadmium. By a small amount is meant an amount much less than that needed to combine with the halogen in the usual halophosphate formula $3Ca_3(PO_4)_2 \cdot CaX_2$, where X represents a halogen such as chlorine or fluorine. The stability or maintenance of calcium halophosphate phosphor for use in ordinary fluorescent lamps is improved to the extent of 1 to 3 lumens per watt after several hundred hours life by the addition of approximately 1% by weight of cadmium; this proportion is suggested for instance in U.S. Patent 2,965,786, Aia et al., issued Dec. 20, 1960.

The object of our invention is to provide a calcium halophosphate phospor particularly suitable for highly loaded fluorescent lamps and which is improved from the point of view of brightness and stability or maintenance.

We have discovered that the brightness and efficiency of calcium halophosphate phosphors used in highly loaded fluorescent lamps, that is lamps having a loading in the range of 20 to 35 watts per foot length are improved by adding from 3.5 to 5% cadmium by weight to the phosphor in the form of a suitable cadmium compound which is mixed in with the ingredients fired to form the phosphor. The results of analysis after firing indicate the presence of 3.0 to 4.5% cadmium by weight retained in the phosphor. The cadmium is incorporated into the calcium halophosphate lattice, in partial replacement of the calcium therein. The phosphor contains the usual antimony or manganese activator for halophosphates, both activators being generally used together.

For further features and advantages of the invention, attention is now directed to the following description of preferred embodiments and examples to be read in conjunction with the accompanying drawing. The features of the invention believed to be novel will be more particularly pointed out in the appended claims.

Figure 1:
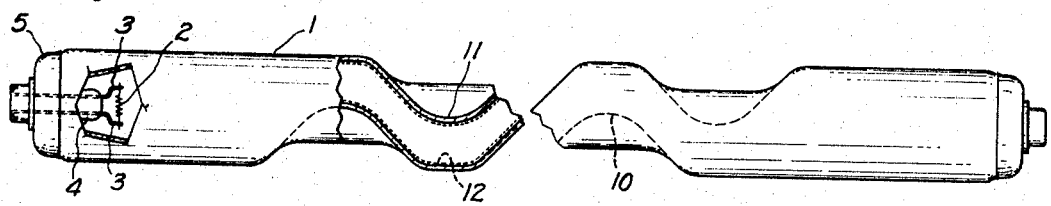
FIG. 1 is a side view of a highly loaded fluorescent lamp of the configurated non-circular cross section type in which the invention is embodied.

Referring to FIG. 1, the illustrated fluorescent lamp comprises a sealed elongated glass envelope 1 shown partly sectioned and shortened by removal of a middle portion. It is provided with electrodes at opposite ends, one being shown at 2 supported across inleads 3. The inleads 3 extend through a stem press 4 sealed to the end of the envelope and are connected to the contacts or terminals of a base 5 cemented to the end of the lamp. The cathodes 2 may each consist of a coil of tungsten wire provided with an overwind and coated with an activated mixture of alkaline earth oxides.

The lamp contains an inert buffer gas such as argon or a mixture of argon and neon at a pressure of a few millimeters of mercury and a small quantity of mercury exceeding the amount vaporized in operation of the lamp.

The illustrated lamp envelope, sometimes referred to as double-grooved, is provided with spaced indentations or re-entrant portions 10, 11 on opposite sides, giving it a dimpled or crenelated appearance. The resulting configuration provides good lamp efficiency at high loadings by reason of the higher electron velocities and reduced elastic collision losses resulting from the more rapid diffusion of photons, electrons and mercury ions to the walls. The envelope configuration also permits regulation of the mercury vapor pressure at the optimum for generation of the desired radiation, as disclosed and claimed in Patents 2,915,664, Lemmers, and 2,950,410, Lemmers et al. These features have made possible lamp loadings in the range of 20 to 35 watts per foot length in lamps operating at efficiencies in the range of 70 to 80 lumens per watt. By way of example, one such lamp sold commercially by applicants' assignee under the trademark Power Groove and designated 96PG17 operates at a current of 1.5 amperes, has an input of about 210 watts in an 8 foot length, and provides an output of about 15,000 lumens. The loading of this lamp is 27 watts per foot.

The envelope walls are internally coated as indicated at 12 with the phosphor of our invention consisting of a calcium halophosphate activated with antimony and manganese and containing an addition of cadmium in the range of 3.5 to 5% before firing.

Figure 2:
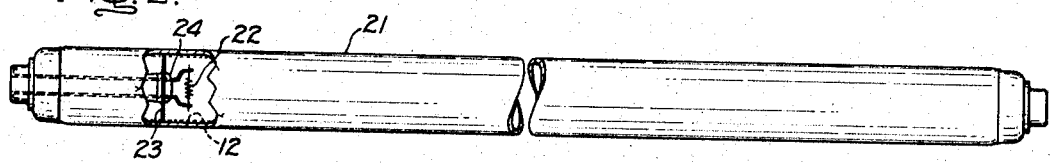
FIG. 2 is a side view of a highly loaded fluorescent lamp of the tubular circular cross section type embodying the invention.

In FIG. 2 a highly loaded fluorescent lamp comprising an envelope 21 of circular cross section is illustrated. The lamp is provided with cathodes 22 of the usual kind at opposite ends behind which disc-like heat shields are mounted about the ends of elongated stem presses 24. The heat shields reflect radiation from the discharge away from the ends of the tube so that the ends are sufficiently cool to maintain the mercury vapor pressure at the optimum of 8 to 10 microns corresponding to about 40 degrees C. The lamp contains a small quantity of mercury and an inert buffer gas filling which develops more heat than in the conventional fluorescent lamp, that is a buffer gas of lower atomic weight than argon, for instance neon or a mixture of neon or helium with argon. Typically, the loading in a commercially available lamp of this nature will range from 20 to 25 watts per foot length. The envelope wall is internally coated, as indicated at 12, with the phosphor of our invention which may be applied by the usual methods.

We have discovered that the optimum percentage of added cadmium for best efficiency and maintenance in a in a calcium halophosphate phosphor varies with the intensity of radiation to which the phosphor is subjected in use.

The aforementioned Aia et al. patent, which is obviously dealing with the common 40-watt fluorescent lamp at the conventional loading of 10 watts per foot, considers 1% cadmium by weight the optimum proportion. The patent in fact asserts that more than about 3% cadmium by weight after firing will actually reduce the efficiency of the phosphor (column 1, lines 33–35), and that fluorescent lamps containing cadmium in higher concentrations (in excess of about 3%) are usually characterized by poor maintenance and by color instability on extended burning (column 4, lines 23–26). We have found on the contrary that for loadings in excess of 20 watts per foot length and specifically for loadings in the range of 20 to 35 watts per foot, cadmium additions in excess of 3% by weight are desirable and provide higher efficiency and better maintenance than additions below 3%.

The cadmium may be added to the mix prior to firing in any convenient form, for instance as oxide, carbonate, chloride, acetate, phosphate. We have found the use of the oxide most convenient. The phosphor raw materials including the cadmium oxide are intimately mixed prior to firing by the usual ball milling procedure. The phosphor is developed by firing the mix in closed crucibles in air or if preferred by firing in open crucibles in a nitrogen atmosphere. Suitable firing temperatures are 1100 to 1200° C. After firing the phosphor is given the usual post-firing treatment including crushing and light milling to break up any agglomerates.

Typical batch formulations for 4500° K. cool white phosphors with 4%, 5% and 6% added cadmium are given in Examples 1, 2 and 3 below. The gram mole figures corresponding to the element or radical have been normalized to 6 (or 5.9999) moles $PO_4$.

Life tests using accelerated or forcing techniques of phosphor depreciation were conducted on conventionally loaded (10 watts per foot) 40-watt fluorescent lamps, and on highly loaded (27 watts per foot) configurated fluorescent lamps as previously described with reference to FIG. 1. The percentage of added cadmium was varied up to 6% and the results for both cases are given in Tables 1 and 2 below.

TABLE 1
[Normal loading test (10 watts/ft.)]

| Number | Percent Added Cd By Wt. | 0 Hours | | 100 Hours | |
|---|---|---|---|---|---|
| | | Lumens | LPW | Lumens | LPW |
| N1 | 0 | 3,085 | 75.2 | 2,968 | 73.4 |
| N2 | 2 | 3,159 | 76.6 | 3,085 | 76.3 |
| N3 | 4 | 3,122 | 75.4 | 3,043 | 75.1 |
| N4 | 6 | 3,100 | 74.1 | 3,014 | 74.3 |

TABLE 2
[High loading test (27 watts/ft.)—Configurated lamp—Non-circular cross section]

| Number | Percent Added Cd By Wt. | 0 Hours | | 100 Hours | | 300 Hours | | Percent Maintenance, 0 Hour 300 Hours |
|---|---|---|---|---|---|---|---|---|
| | | Lumens | LPW | Lumens | LPW | Lumens | LPW | |
| PG1 | 1 | 16,243 | 76.4 | 13,565 | 62.8 | 11,840 | 55.5 | 72.9 |
| PG2 | 2 | 16,143 | 75.7 | 12,960 | 61.7 | 11,620 | 55.3 | 72.0 |
| PG3 | 3 | 16,207 | 76.8 | 13,237 | 63.1 | 11,633 | 55.0 | 71.8 |
| PG4 | 4 | 16,083 | 75.4 | 13,627 | 64.3 | 12,273 | 57.7 | 76.3 |
| PG5 | 5 | 16,083 | 75.1 | 13,160 | 61.8 | 11,775 | 55.8 | 73.3 |

EXAMPLE 1
[4% added cadmium]

| Material | Wt. in gms. | Wt. percent | Element | Gram-moles |
|---|---|---|---|---|
| $CaHPO_4$ | 657.0 | 65.70 | Ca | 9.3337 |
| $CaCO_3$ | 187.3 | 18.73 | $PO_4$ | 5.9999 |
| $CaF_2$ | 55.6 | 5.56 | Cd | .3879 |
| CdO | 39.4 | 3.94 | Mn | .2046 |
| $Sb_2O_3$ | 21.2 | 2.12 | $Sb_2O_3$ | .0915 |
| $NH_4Cl$ | 19.5 | 1.95 | $F_2$ | .8992 |
| $MnCO_3$ | 19.9 | 1.99 | $Cl_2$ | .2311 |
| | | 99.99 | | |

EXAMPLE 2
[5% added cadmium]

| Material | Wt. in gms. | Wt. percent | Element | Gram-moles |
|---|---|---|---|---|
| $CaHPO_4$ | 657.0 | 65.70 | Ca | 9.2356 |
| $CaCO_3$ | 179.5 | 17.95 | $PO_4$ | 5.9999 |
| $CaF_2$ | 55.6 | 5.56 | Cd | .4860 |
| CdO | 49.4 | 4.94 | Mn | .2042 |
| $Sb_2O_3$ | 21.2 | 2.12 | $Sb_2O_3$ | .0919 |
| $NH_4Cl$ | 19.5 | 1.95 | $F_2$ | .8995 |
| $MnCO_3$ | 19.9 | 1.99 | $Cl_2$ | .2311 |
| | | 100.21 | | |

EXAMPLE 3
[6% added cadmium]

| Material | Wt. in gms. | Wt. percent | Element | Gram-moles |
|---|---|---|---|---|
| $CaHPO_4$ | 657.0 | 65.70 | Ca | 9.1372 |
| $CaCO_3$ | 171.4 | 17.14 | $PO_4$ | 5.9999 |
| $CaF_2$ | 55.6 | 5.56 | Cd | .5844 |
| CdO | 59.4 | 5.94 | Mn | .2605 |
| $Sb_2O_3$ | 21.2 | 2.12 | $Sb_2O_3$ | .0919 |
| $NH_4Cl$ | 19.5 | 1.95 | $F_2$ | .8995 |
| $MnCO_3$ | 19.9 | 1.99 | $Cl_2$ | .2042 |
| | | 100.40 | | |

It will be noted that Table 1 corresponding to conventional loading of common 40-watt fluorescent lamps confirms that the optimum cadmium percentage for maximum lumens is less than 3%, peak lumens at 100 hours being 3085 and lumens per watt being 76.1 for 2% added Cd by weight. However in the highly loaded configurated lamp, the optimum percentage of added cadmium on the basis of 300 hour percent maintenance, that is the ratio of 0 hour lumens to 300 hour lumens, is 4% (before-firing), the corresponding lumen maintenance figure being 76.3%. It will be noted that for cadmium percentages of 4 and 5% (before firing), the 300 hour maintenance is superior to that for cadmium percentages of 3% or less. Other tests have shown that improved maintenance in highly loaded lamps occurs in the range of 3.5 to 5% added cadmium before firing, corresponding to 3.0 to 4.5% retained cadmium. The preferred amount of retained cadmium after firing is approximately 3.5%. The exact amount retained depends upon the formulation, for instance the base-acid ratio.

The unexpected advantage of a higher cadmium concentration has also been confirmed for circular cross section fluorescent lamps operated at higher loadings and corresponding to the embodiment described with reference to FIG. 2. Force test results on such lamps using phosphors with cadmium percentages of 0, 2, and 4% are given in Table 3 below.

TABLE 3
[High loading test (25 watts/ft.)—Circular cross section lamps]

| Number | Percent Added Cd By Wt. | 0 Hours | | 500 Hours | | Percent Maintenance, 0 Hours 500 Hours |
|---|---|---|---|---|---|---|
| | | Lumens | LPW | Lumens | LPW | |
| HL1 | 0 | 3,051 | 74.7 | 2,527 | 61.4 | 83 |
| HL2 | 2 | 3,168 | 77.1 | 2,687 | 64.9 | 84 |
| HL3 | 4 | 3,124 | 74.6 | 2,744 | 66.5 | 89 |

It will be observed that whereas the 0 hour or initial brightness was a maximum with 2% cadmium, the 500 hours maintenance is highest with 4% added cadmium (before firing).

The mole percentages of cadmium to phosphate in the fired product, that is in the finished phosphor will generally be 10 to 15% less than in the starting mixture. Therefore, whereas we prefer to add 3.5 to 5% cadmium by weight to the starting mixture, our preferred proportion of cadmium in the fired product is from 3.0 to 4.5% by weight.

What we claim as new and desire to secure by Letters Patent of the United States is:

1. A fluorescent lamp for a loading in the range of 20 to 35 watts per foot of length comprising an elongated vitreous envelope provided with electrodes at opposite ends and containing a filling of mercury exerting a pressure of a few microns in operation at said loading and an inert buffer gas at a filling pressure of a few millimeters, and a phosphor coating on the inside surface of said envelope, said phosphor comprising calcium halophosphate activated with manganese and antimony and containing from 3.0 ot 4.5 weight percent retained cadmium substituted for calcium.

2. A fluorescent lamp for a loading of approximately 27 watts per foot length comprising an elongated vitreous envelope provided with electrodes at opposite ends and containing a filling of mercury exerting a pressure of a few microns in operation at said loading and an inert buffer gas at a filling pressure of a few millimeters, and a phosphor coating on the inside surface of said envelope, said phosphor comprising calcium halophosphate activated with manganese and antimony and containing approximately 3.5 weight percent retained cadmium substituted for calcium.

References Cited
UNITED STATES PATENTS 2,965,786   12/1960   Aia _____ 313—109

JAMES W. LAWRENCE, *Primary Examiner.*

R. JUDD, *Assistant Examiner.*